United States Patent [19]
Halstead et al.

[11] 3,913,014
[45] Oct. 14, 1975

[54] DEMAND METER FOR ON-PEAK MAXIMUM DEMAND METERING

[75] Inventors: Kenneth G. Halstead; Eugene C. Benbow, both of Raleigh, N.C.

[73] Assignee: Westinghouse Electric Corporation, Pittsburgh, Pa.

[22] Filed: June 13, 1974

[21] Appl. No.: 479,071

[52] U.S. Cl............................ 324/103 R; 324/116
[51] Int. Cl.² ................. G01R 19/16; G01R 15/08
[58] Field of Search........................ 324/103 R, 116

[56] References Cited
UNITED STATES PATENTS

| | | | |
|---|---|---|---|
| 1,078,206 | 11/1913 | Mayer | 324/116 |
| 1,125,312 | 1/1915 | Hall | 324/103 R |
| 2,132,256 | 10/1938 | Cameron | 324/116 |
| 2,497,678 | 2/1950 | MacIntyre et al | 324/103 R |
| 3,683,343 | 8/1972 | Feldman et al | 324/116 |

*Primary Examiner*—Alfred E. Smith
*Assistant Examiner*—Ernest F. Karlsen
*Attorney, Agent, or Firm*—R. W. Smith

[57] ABSTRACT

A demand meter is described having daily on and off periods of maximum demand metering. A time indicating mechanism and an on-off timing mechanism are driven by a timing motor to establish predetermined periods of maximum demand measurements corresponding to on-peak power demand periods. A releasable gear coupler is included in the on-off timing mechanism to selectively connect and disconnect a watt demand indicating mechanism with a watt-hour meter movement so that the meter continuously indicates the consumption of electrical energy while indicating maximum demand occurring only during predetermined on-peak measuring periods.

14 Claims, 10 Drawing Figures

FIG.1.

DEMAND METER FOR ON-PEAK MAXIMUM DEMAND METERING

CROSS-REFERENCE TO RELATED APPLICATIONS

This invention is related to application Ser. No. 287,922 for "An Improved Integral Timing Mechanism For A Maximum Demand Meter" filed Sept. 11, 1972 and assigned to the assignee of this invention.

BACKGROUND OF THE INVENTION

This invention relates to demand meters and more particularly to an improved mechanical demand register having a time indicating mechanism and an on-off timing mechanism for predetermined daily measurements of maximum demand during on-peak power demand periods.

It is known to measure maximum demand with an integrating watt-hour meter movement by continuously indicating the consumption of electrical energy by an electrical load during short predetermined demand intervals. The highest measurement during one of the demand intervals indicates the maximum electrical power in watts required to supply the load. Typically, a demand meter includes a watt-hour meter movement with a mechanical register which indicates both the total consumption of electrical energy in kilowatt-hours and the maximum electrical power demand in kilowatts as measured during predetermined demand intervals of 15 or 30 minutes, for example.

Generally, the maximum power demands of an electric utility power distribution system occur during the same period each day. This is conventionally referred to as an on-peak demand period. The remaining period of each day is referred to as the off-peak period. As is known, the capacity of an electric power distribution system is determined by the maximum power required to be supplied during the on-peak periods for which a demand penalty is charged. it is desired to measure the demand of an electric load only during the on-peak period. This is desirable in order to encourage the electric power customers to have their maximum power load demands occur during the off-peak periods so as to avoid paying the additional demand billing costs and to aid in reducing the total capacity requirements of an electric distribution system. More specifically, it is desirable to utilize modified mechanical demand register which includes a minimum of additional uniquely arranged components to perform periodic maximum demand measurements only during daily periods corresponding to on-peak demand periods.

SUMMARY OF THE INVENTION

In accordance with the present invention a demand meter includes an improved mechanical demand register having an adjustable time indicating mechanism and an on-off timing mechanism driven simultaneously by a single timing motor. A releasable coupler in the on-off timing mechanism periodically effects driving connection between a watt-hour meter movement and a maximum demand indicating mechanism. A manually adjustable member resets the time indicating mechanism and concurrently synchronizes the on-off timing mechanism with the existing time. The coupler is then effective to interconnect the demand indicating mechanism and the meter movement during a predetermined maximum demand measuring period each day.

One feature of this invention is to utilize an existing timing motor drive for a demand interval timing mechanism so as to further drive a time indicating mechanism and still further drive an on-off timing mechanism. Another feature of this invention is to provide an on-off timing mechanism which includes an intermittent motion gearing arrangement to efficiently control a releasable gear coupler. A further feature of this invention is to provide a cam and cam follower arrangement in the on-off timing mechanism in which a predetermined camming surface establishes daily on and off measuring periods for selective metering of maximum demand. A still further feature of this invention is to provide alternative overriding cam disc arrangements for adjusting the on-peak measuring and off-peak non-measuring periods without disassembly of the register. And a still further feature of this invention is to provide an on-peak mechanical demand register having a minimum of simple and reliable components in which parts in the on-off timing mechanism are removable so that the parts can be installed and removed without changing the operation of a demand interval timing mechanism and a demand indicating mechanism to permit convertible use of the register for either on-peak or continuous demand metering. Other features and advantages will be apparent from the drawings and detailed description hereinbelow.

DESCRIPTION OF THE PREFERRED EMBODIMENTS

Figure 1:
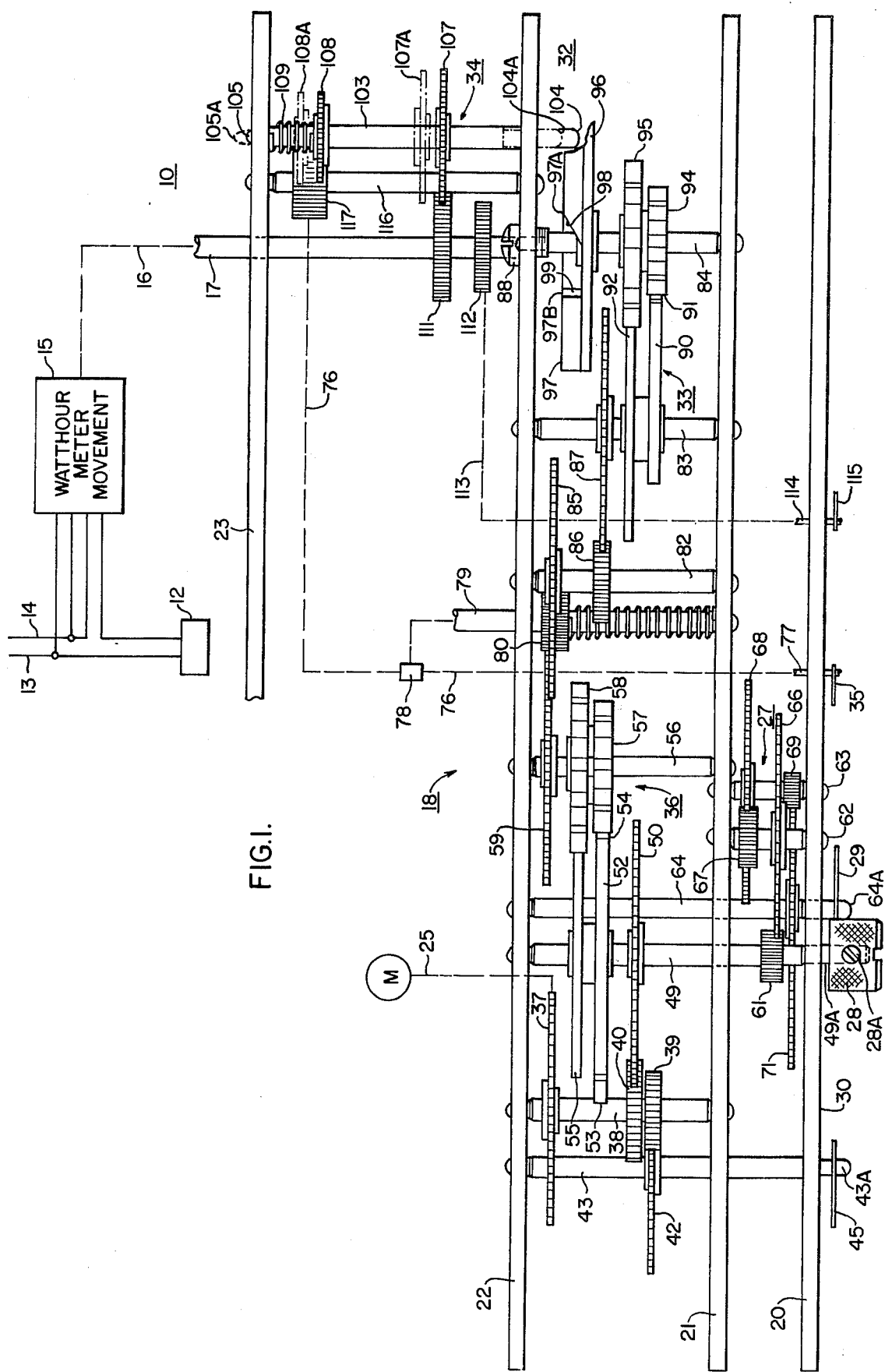
FIG. 1 illustrates a demand meter made in accordance with the present invention with a portion thereof shown in schematic form and further showing a detailed fragmentary top view of an on-peak mechanical demand register.

Referring now to the drawings and more particularly to FIG. 1, there is shown a demand meter 10 for metering the total consumption of electricity and periodically metering maximum demand during predetermined daily periods for an electric load 12 in accordance with the present invention. The electric load 12 is supplied electrical power through the conductors 13 and 14 from the distribution system of an electric utility company. A watt-hour meter movement 15, of an electromechanical integrating type watt-hour metering means understood by those skilled in the art, has voltage and current electromagnetic sections connected to the conductors 13 and 14. In accordance with the operation of the watt-hour meter movement, the output of the movement, represented by dashed line 16, directly drives a shaft 17 at a rate proportional to the electrical energy consumed by the electric load 12 so that the accumulated shaft rotations are representative of the electrical energy consumed.

The meter 10 includes a mechanical on-peak maximum demand register 18 made in accordance with the present invention. The general arrangement of the register 18 is the same as described at copending application Ser. No. 287,922 for "An Improved Integral Timing Mechanism For A Maximum Demand Meter," filed Sept. 11, 1972 and assigned to the assignee of this invention. The maximum demand meter register described in the forementioned application is further described in publication I.L. 42-302.4A, dated December 1972 available from Westinghouse Electric Corporation, Meter Division, Raleigh, North Carolina. U.S. Pat. Nos. 3,421,084 issued Jan. 7, 1969; 3,406,338 issued Oct. 1968 and 3,136,947 issued June 9, 1964 all assigned to the assignee of this invention, disclose parts corresponding to parts of the register 18 as noted further hereinbelow. As further described in detail hereinbelow, additional parts are provided and there are modifications of some of the parts described in the above-identified references to provide the function and operation of the register 18 in accordance with the present invention.

Figure 2:
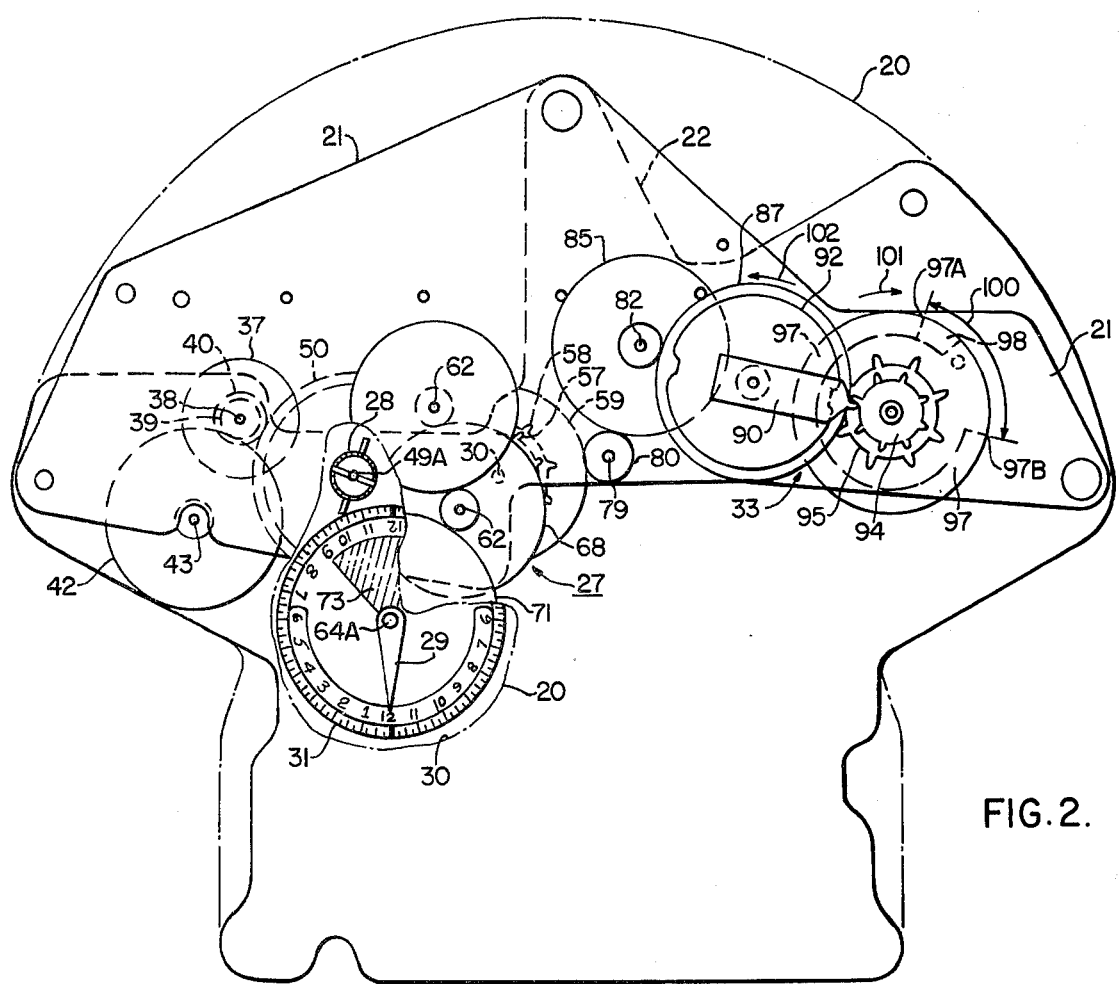
FIG. 2 illustrates a front view, with parts removed, of the register shown in FIG. 1.
Figure 3:
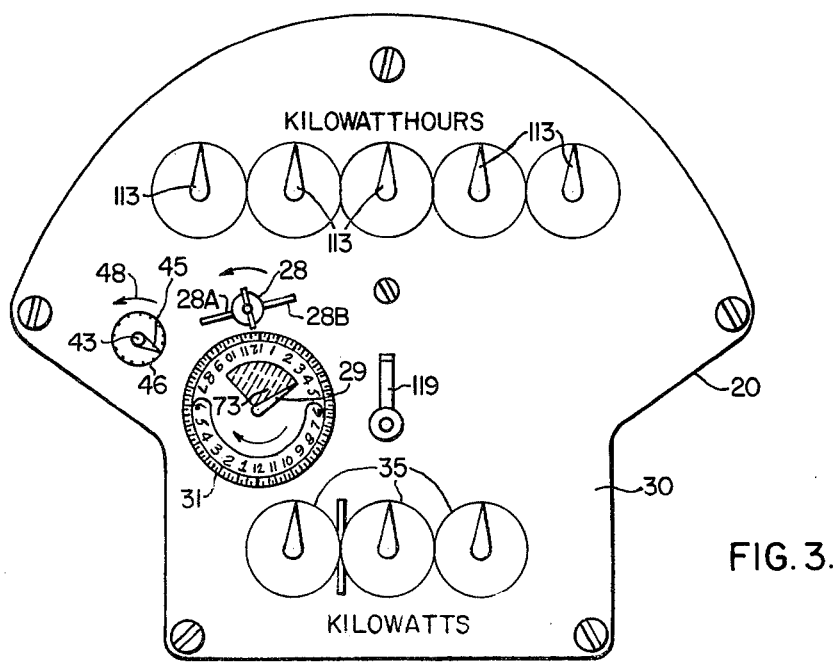
FIG. 3 illustrates a front plan view of the register shown in FIG. 1.

The rotational parts of the register 18 are supported between a dial plate 20, a sub-plate 21, a middle plate 22, a ratio plate 23 and a rear plate, not shown. Rotational drive inputs to the register 18 include the watt-hour meter movement output 16 and a timing motor M having an output represented by the broken line 25. The main parts added to the prior maximum demand meter register of the aforementioned application include a time indicating mechanism 27 including a gear train supported between the plates 20 and 21. A manually adjustable reset knob 28 and a pointer 29 of the time indicating mechanism 27 are positioned adjacent the front face 30 of the dial plate 20 as also shown in FIGS. 2 and 3. The pointer 29 rotates clockwise in the center of a twenty-four hour clock dial 31 on the face 30.

Further main parts added to the prior register and made in accordance with this invention, include an on-off timing mechanism 32 having an intermittent motion gearing arrangement 33 supported between the sub-plate 21 and the middle plate 22. The mechanism 32 further includes a releasable gear coupler unit 34 operated in response to the intermittent motion gearing arrangement 33. As described in further detail hereinbelow, the gear coupler unit 34 periodically connects and disconnects the shaft 17 from a driving relationship with maximum demand indicating pointers 35 shown in FIG. 3. The time indicating and on-off timing mechanisms 27 and 32 are capable of being assembled to and, if desired, removed from the register of the aforementioned application with slight modification without altering the function and operation of the parts described therein while providing the new on-peak demand register 18 of this invention.

The timing motor output 25 transmits a constant speed drive to the time indicating mechanism 27, the on-off timing mechanism 32 and a demand interval timing mechanism 36 which is substantially identical to the interval timing mechanism disclosed in the aforementioned application. The motor M and its output 25 are also the same as disclosed in the application to drive a large gear 37 on a shaft 38. A pair of output gears 39 and 40 are provided on the shaft 38. The gear 39 drives an interval indicator gear 42 carried on a shaft 43. The forward end 43A of the shaft 43 extends through the dial plate 20 and carries an elapsed time or demand interval pointer 45.

As shown in FIG. 3, the pointer 45 rotates relative to a demand interval dial 46 provided on the dial plate face 30. The pointer is rotated one complete revolution for each demand interval which is typically either 15 or 30 minutes. In the register 18, the demand interval timing mechanism 36 provides a demand interval of 15 minutes. The dial 46 has 15 divisions or markings indicating each minute which elapse in the 15 minute demand interval or fraction of a minute of the demand interval as indicated by the position of the pointer 45 between adjacent divisions of the dial 46. The pointer 45 rotates counterclockwise relative to the dial 46 as indicated by the directional arrow 48. The dial 46 is further utilized as a vernier dial relative to the clock dial 31 when resetting the pointer 29 and the on-off timing mechanism as described hereinbelow.

The demand interval timing mechanism 36 is driven by the output gear 40 of the shaft 38. An input shaft 49 of the mechanism 36 carries a large gear 50 which has meshing engagement with the gear 40. The interval timing mechanism 36 includes the same intermittent motion gearing arrangement as described in the aforementioned application. Accordingly, the shaft 49 carries an arm 52 having two single involute gear tooth projections 53 and 54 and a locking disc 55. The output of the intermittent motion gearing is formed by the shaft 56 carrying an eight tooth gear 57 which is intermittently driven by the gear tooth projections 53 and 54. A locking gear 58 is also carried on a shaft 56 to provide cooperative engagement with the locking disc 55. A large gear 59 fixed to the shaft 56 transmits the intermittent rotation of the shaft 56 as described further hereinbelow. Accordingly, the shaft 49 is rotated approximately one revolution every 15 minutes by the motor M so that the shaft 56 is quickly rotated one-eighth of a revolution or 45° each 7½ minutes.

The shaft 49 is a modification of the corresponding input shaft to the interval timing mechanism 36 described in the aforementioned application Ser. No. 287,922 with the forward end 49 altered to extend beyond the sub-plate 21 and through the dial plate 20. The outer end 49A of the shaft 49 supports the reset knob 28 as shown. A pair of diametrically opposed studs 28A and 28B extend from the knob. A small gear 61 is mounted on the shaft 49 between the plate 20 and 21, as shown, to provide a rotational drive input to the time indicating mechanism 27.

The mechanism 27 includes shafts 62 and 63 mounted for rotation in the plates 20 and 21 and a shaft 64 is mounted for rotation in the plates 22 and 20. An outer end 64A of the shaft 64 extends through the dial plate 20 to support the time indicating pointer 29. The pointer 29 frictionally engages the shaft end 64A and can be manually shifted thereon. The shaft 62 includes a large gear 66 meshing with the gear 61. A small gear 67 is further mounted on the shaft 62. A large gear 68 on the shaft 63 meshes with the gear 67 and a small gear 69 of the shaft 63 meshes with a large gear 71 on the shaft 64 as shown. The gears just described in the time indicating mechanism 27 provide a speed of one revolution per hour for the shaft 62, a speed of one revolution every four hours for the shaft 63 and a speed of one revolution every 24 hours for the shaft 64 and, therefore, for the time indicating pointer 29.

As shown in FIG. 3 and in a fragmentary view of the plate 20 in FIG. 2, the clock dial 31 is provided on the dial plate front face 30 around the shaft end 64A and under the pointer 29. The circular clock dial 31 is preferably printed directly on the dial face 30 or alternatively may be provided by a separate dial plate held in place by removable fasteners such as screws. The dial 31 is divided into 96 equal divisions representing 15 minute periods. Numerals represent each 12 hour half-day periods with "noon" designated at the top of the dial and "midnight" designated at the bottom of the dial with the 12 hour night period from 6 o'clock in the evening to 6 o'clock in the morning being outlined in black at the bottom half of the dial. An on-peak demand measuring period is further indicated on the dial 31 by a segment 73 preferably colored red. The segment 73 designates the on-peak demand measuring period or the hours during each 24 hour daily period that the maximum demand measurement occurs as described further hereinbelow. The segment 73 is preferably a separate part secured by an adhesive or by fasteners such as screws to secure it in overlapping relationship to the dial 31. In FIG. 3 the segment 73 extends between 9 A.M. and 3 P.M. to illustrate an exemplary on-peak demand measuring period of 6 hours.

Referring further to the register 18 showing FIGS. 1 and 2, there is included a maximum demand indicating mechanism represented by broken line 76 which includes a shaft 77 carrying one of the maximum demand indicating pointers 35. The mechanism indicated by the broken line 76 includes a pusher drive and reset mechanism represented by schematic block 78 as noted in the aforementioned application. As described in this application, the output gear 59 of the shaft 56 drives a shaft 79 by meshing with a small input gear 80 carried by the shaft 79. The shaft 79 further carries a cam assembly, not shown, included in the mechanism 78 and is described in the aforementioned U.S. Pat. No. 3,460,338 which actuates a clutch to control the reset operation associated with the pusher drive and reset mechanism 78. As described in the above-identified patent, a pusher is returned or reset to a zero condition at the end of each demand interval as controlled by the demand interval timing mechanism 36. The shaft 79 is rotated through a 360° complete revolution during each demand interval. As further noted in the above-identified patent, the mechanism 78 moves the pointers 35 to higher readings when the maximum demand measured during an interval is higher than any preceding interval of measured demand.

The on-off timing mechanism 32 includes the rotatable shafts 82, 83 and 84 which are added to the register described in the application Ser. No. 287,922 between the plates 21 and 22. The input shaft 82 forms a timing input of the mechanism 32 and carries a large gear 85 meshing with the gear 80. A small gear 86 on the shaft 82 meshes with a large input gear 87 of the shaft 83. The shafts 83 and 84 include the intermittent motion gearing arrangement 33 which is substantially identical to the intermittent motion gear arrangement included in the interval timing mechanism 36. A bearing screw 88 is carried in a threaded hole of the middle plate 22 to removably support the rearward end 84. This permits removal of the shaft 84 to convert the register 18 to a demand meter register having the same operation as the register disclosed in the aforementioned application.

The intermittent motion arrangement 33 includes the gear 87 corresponding to the gear 50 included in mechanism 36. An arm 90 corresponding to the arm 52 includes one single involute gear tooth projection 91 corresponding to one of the involute gear projections 53 or 54 of the arm 52. A locking disc 92 is also carried on the shaft 83 and corresponds to the locking disc 55. An eight tooth gear 94 is carried on the shaft 84 for the intermittent rotation upon engagement by the gear tooth projection 91 so as to correspond to the operation of the mechanism 36 except that the gear 94 is quickly rotated once for 45 arcuate degrees rather than twice for 90° with each 360° rotation of the shaft 83 and arm 90. The shaft 84 further includes the locking gear 95 corresponding to the locking gear 58.

The output of the shaft 84 is provided by a cam disc 96 press fitted to the shaft 84 for rotating therewith in response to the intermittent rotation of the eight tooth gear 94. A circular segment camming surface 97 is formed on the flat side of cam disc 96 by a thicker or raised sector extending a predetermined circular arcuate distance around outer circumference of the cam disc 96 and rearwardly along the axis of the shaft 84 as shown in FIGS. 1 and 2. The camming surface 97 includes an inclined leading edge 98 extending rearwardly from side of the cam disc to one end 97A of the surface 97. A sharp forward turned trailing edge 99 defines the other end 97B of the camming surface 97. The raised camming surface 97 determines the off-time of the demand metering and the open distance 100 between the ends 97A and 97B determines the on-time for demand metering.

The cam disc 96 and arm 90 are rotated in the directions indicated by the directional arrows 101, 102 shown in FIG. 2. The open arcuate length 100 between the ends 97A and 97B of the camming surface 97 is shown extending substantially 90° to provide the 6 hour on-peak maximum demand measuring period indicated by the dial segment 73. The arcuate length between the camming surface ends is preferably made in different arcuate distances in increments of 45° corresponding to different three hour on-peak demand measuring periods since the shaft 84 is intermittently rotated through one-eighth or 45° incremental revolutional steps. This is provided since the ratio between the shafts 79 and 82 has a ratio of four to one so as to rotate the arm 90 one complete revolution every three hours. For example, a twelve hour on-peak demand measuring period is provided by an arcuate extent of 180° between the surface ends 97A and 97B.

The releasable coupler unit 34 is operated in the on-off timing mechanism 32 with a shaft 103 thereof, shown in FIG. 1, rotatable and axially slidable in the middle plate 22 and ratio plate 23. The shaft 103 has a forward axial position shown in full lines in FIG. 1 and a second or rearward axial position shown by broken lines. A forward end 104 of the shaft 103 has a reduced diameter which extends through an opening in the plate 22 so as to be axially alignend with and engageable by the camming surface 97. The annular shoulder at the inner end of the shaft end 104 engages the rear side of the plate 22 to establish the forward shaft position. Rearward end 105 of the shaft 103 also has a reduced diameter and is slidable through an opening in the plate 23.

Gears 107 and 108 are fixedly attached for rotation with the shaft 103. A coil spring 109 encircling the shaft 103 has the spring ends confined between the plate 23 and the gear 108 so as to bias the shaft 103 forward toward the cam disc 96. Accordingly, the shaft end 104 is biased to the forward position along the longitudinal axis of the shaft 103 so as to extend into the arcuate space between camming surface ends 97A and 97B and to be slightly disengaged from the rear flat side of the cam disc 96 when it is rotated between the positions for the on-peak demand measuring period. Thus the axial tip of the shaft end 104 forms a cam follower part. As the camming surface 97 rotates, the shaft end 104 is first engaged by the inclined edge 98 of the camming surface 97 and is driven to the rearward axial position, as indicated by the dash lines 104A. This rearward shaft position is reached when the camming surface end 97A is adjacent the shaft end 104A. This axially shifts the shaft 103 so that the gear 107 is positioned as indicated by the broken lines 107A. Accordingly, the gear 108 assumes the position indicated by the broken lines 108A and the shaft end 105 is moved to the position indicated by broken lines 105A. When the camming surface end 97B rotates past the shaft end 104 it drops into the open space defined by the arcuate distance 100.

A demand gear 111 secured on the shaft 17 is in a meshing engagement with the gear 107 and forms a demand metering drive input to the coupler 34 when the shaft 103 is in the forward position. The gears 111 and 107 are demeshed and the shaft 103 is decoupled therefrom when the shaft 103 is in the rearward position. A watt-hour gear 112 is also fixed for rotation on the shaft 17 and drives a watt-hour indicating mechanism represented by the broken lines 113 and described in the aforementioned U.S. Pat. No. 3,136,947 which includes a shaft 114 and kilowatt-hour pointers 115 also shown on the dial face 30 illustrated in FIG. 3. The watt-hour indicating mechanism 113 continuously indicates the consumption of electrical energy in response to rotation of the shaft 17 in the manner described in the aforementioned patent.

As indicated in FIG. 1, when the shaft 103 is in its most forward position, shown by the solid line position, the gear 107 is meshed with the gear 111 of the shaft 17. This transfers rotation of the shaft 17 to the shaft 103 and the gear 108 which forms the output of the coupler 34.

A shaft 116 rotationally supported between the plates 22 and 23 carries a wide gear 117. The gear 108 rotates on shaft 103 continuously in engagement with the wide gear 117 as the shaft 103 is shifted between its two axial positions. The gear 117 is directly coupled to the maximum demand indicating mechanism 76 so as to operate the pusher associated with the pusher drive and reset mechanism 78 to provide the maximum demand indication at the pointers 35. This pusher operation is described in the above noted U.S. Pat. No. 3,421,084. When the shaft 103 is in the rear axial position so that the gear 107 is demeshed from the gear 111, the shaft 103 will not rotate and no maximum demand indications will be provided by the pointers 35. Since the shaft 17 continues to be rotated by the watt-hour meter movement 15, the gear 112 will continuously drive the watt-hour indicating mechanism 113 and pointers 115.

In accordance with the operation of the register 18, the shaft 17 is rotated at a rate corresponding to the consumption of electrical energy by the electrical load 12. This continuously drives the watt-hour gear 112 and the demand gear 111 as electrical power is supplied through the conductors 13 and 14 to the load 12. The kilowatt-hour pointers 115, shown in FIGS. 1 and 3 will indicate the electrical consumption in a well known manner.

To effect measuring of the maximum kilowatt demand of the electric load 12 only during on-peak demand measuring periods, the coupler unit 34 is controlled in the on-off timing mechanism 32 to mesh and demesh the gear 107 with the demand gear 111 so as to render the maximum demand indicating mechanism 76 in either an active or an inactive maximum demand metering state. The active and inactive maximum demand metering states correspond to the on-peak maximum demand metering period and off-peak demand metering period as indicated by the time indicating pointer 29.

To initially set the time indicating pointer 29 or to reset the pointer following a power outage, the reset knob 28 is manually rotated so that the pointer 29 indicates the existing time on the clock dial 72. The knob 28 is rotated counterclockwise as viewed in FIGS. 2 and 3 so as to rotate the shaft 49. This rotates the gear 61 and the gears of the time indicating mechanism 27 including the gears 66, 67, 68, 69 and 71 which rotate the shaft 64 carrying the pointer 29. Concurrently, gear 50 of the shaft 49 rotates the gears 40 and 39 so that shaft 38 drives the gear 42 and the shaft 43 carrying the demand interval pointer 45. If the desired time to be set is other than at an exact 15 minute interval of an hour, the pointer 45 is used as a vernier to more accurately set the time indicating pointer 29. For example, if the time to be set is 8:50 P.M., the pointer 29 is rotated through the mechanism 27 to the third or forty-five minute division past 8 P.M. on the upper half of the dial 31 and then the pointer 45 is observed and rotated until it is at the fifth or five minute division from the top of the dial 46.

Rotation of the knob 28 and shaft 49 also rotates the arm 52 in the intermittent motion gearing arrangement of the interval timing mechanism 36. Thus, the resetting operation in the mechanism 78 of the demand indicating mechanism 76 will occur at the end of each demand interval and this occurs every 15 minutes in the register 18 as described above. The intermittent rotation of the shafts 56 and 79 performs the demand interval resetting operations and concurrently drives the on-off timing mechanism 32 intermittently through the gears 80, 85, 86 and 87 to rotate the shafts 82 and 83. This intermittently rotates the shaft 84 through the intermittent motion gearing arrangement 33 formed by the arm 90 carrying the single gear tooth projection 91 and the eight tooth gear 94. Accordingly, rotation of the knob 28 rotates the cam disc 96 and the camming surface 97 concurrently with movement of the time indicating mechanism 27 as indicated by the pointer 29 thereof the same as does the motor output 25.

Synchronization of the on-off timing mechanism with pointer 29 is verified by observing that the shaft end 104 is aligned in the opening between camming surface ends 97A and 97B as the pointer 29 passes over the area of the on-peak demand segment 73 with rotation of the knob 28. If the pointer 29 is outside the segment 73 during the aforementioned orientation of the camming surface ends 97A and 97B, the pointer 29 can be shifted on the shaft 64 since it frictionally engages the shaft. For example, the knob 28 can rotate the camming surface 97 until the shaft end 104 drops over the surface edge 99 at the end 97B and the pointer 29 is shifted on the shaft 64 until it is aligned with the beginning of the on-peak dial segment 73. Thereafter, the knob 28 is rotated to rotate the pointer 29 to the existing time at the meter 10. Also, initially the watt demand pointers 35 are set to a zero reading by a reset lever 119 shown in FIG. 3 which operates in a known manner as described in the aforementioned U.S. Pat. No. 3,421,084.

In metering operation of the meter 10, the watt-hour meter movement 15 rotates the shaft 17 in response to the consumption of electrical energy of electric load 12 as noted hereinabove. The motor M drives the gear 37 through the timing motor output 25 and the shaft 38 drives the shaft 43 through the gear train including gears 37, 39 and 42. Rotation of the shaft 38 also rotates the gear 40 to rotate the large gear 50 of the shaft 49 to transmit the motor drive to the demand interval timing mechanism 36, the on-off timing mechanism 32 to control the releasable gear coupler unit 34 as described hereinabove in connection with the setting of the pointer 29. Also, the rotation of the shaft 49 by the motor M rotates the time indicating mechanism 27 as also described hereinabove in connection with the manual operation of the knob 28 and shaft 49.

Accordingly, the camming surface 97 is intermittently driven through the two intermittent motion gearing arrangements of the interval timing mechanism 36 and of the on-off timing mechanism 32. This provides a highly efficient operation enabling the single timing motor M to drive not only the demand interval timing mechanism 36 and the demand interval indicator pointer 45 as in the above noted prior demand metering register but to also drive the additional time indicating mechanism 27 and the on-off timing mechanism 32 to effect on and off demand metering through the releasable coupler unit 34. It is noted that the camming surface 97 has a predetermined configuration so that the maximum demand measuring period corresponds to the on-peak demand period to be measured and is preferably established in multiples of three hours since the shaft 84 is quickly driven through a one-eighth partial revolution every three hour time period during a complete rotation of the shaft 84 occurring in a twenty hour period. During manufacture of various cam surface configurations can be provided to provide the desired duration of the maximum demand metering and the camming surface 97 may be synchronized relative to the time indicating mechanism 27 by adjusting the pointer 29 to provide the measuring period at the on-peak demand period.

Figure 4:
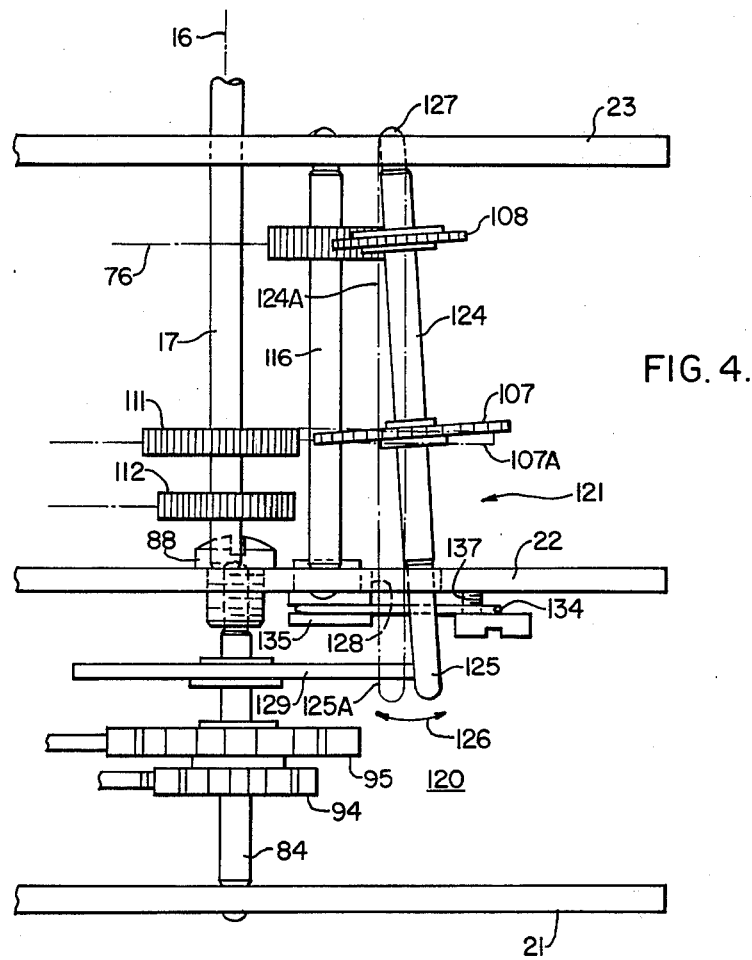
FIG. 4 illustrates a fragmentary view of an alternative embodiment of the register shown in FIG. 1 including different on-off timing mechanism.
Figure 5:
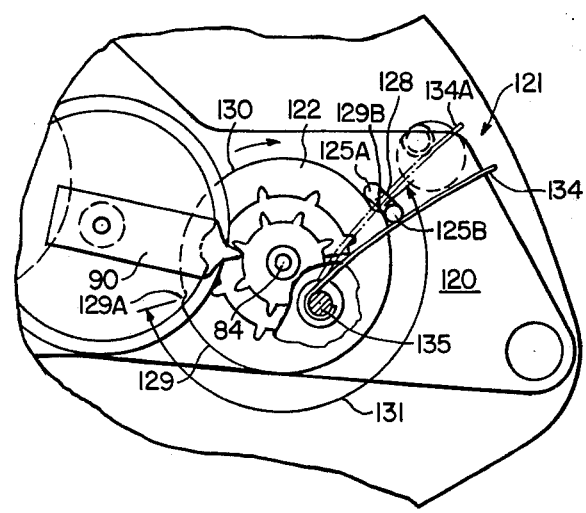
FIG. 5 illustrates a fragmentary front view with parts removed of FIG. 4.

In FIGS. 4 and 5 there is shown an on-off timing mechanism 120 including an alternative embodiment of a releasable gear coupler 121 and an alternative embodiment of a cam disc 122 on the shaft 84 that replaces the coupler 34 and the cam disc 96 shown in FIG. 1. The coupler 121 includes a shaft 124 carrying the gears 107 and 108 described hereinabove. The shaft 124 includes a forward end 125 having a reduced diameter that is arcuately swingable, indicated by arrow 126 in FIG. 4, between an outer position shown with solid lines and an inner position indicated by broken lines 125A. The rearward end 127 of the shaft 121 has a reduced diameter and is pivotally supported in the plate 23 as shown in FIG. 4. The forward shaft end 125 extends through an elongated closed end slot 128 in the plate 22. The forward terminal end of the end 125 extends beyond the cam disc 122 so that it forms a cam follower engaging the peripheral edges of the cam disc 122.

A camming surface 129 is formed on the disc edge as shown in FIG. 5. The camming surface 129 is formed by a larger radius disc circular edge between the leading surface end 129A and trailing camming surface end 129B where the disc edge tapers radially inward to a shorter radius disc circular edge 130. The open arcuate distance 131 of the edge 130 between the camming surface ends 129A and 129B corresponds to the arcuate distance 100 shown in FIG. 2 for the cam disc 96 except the distance is 180° corresponding to an on-peak demand measuring period of 12 hours to illustrate another exemplary distance and on-peak metering period.

A straight wire spring 134 is secured at one end to the plate 22 below and to the left of the slot 128, as viewed in FIG. 4, by a rivet 135. The free end of the spring 134 extends upward and laterally against the shaft end 125 to bias it against the peripheral edges of the cam disc 122. This also biases the shaft 124 toward the shaft 17 for effecting meshing engagement between the gears 107 and 111. An eccentric post 137 guides and limits inward position of the spring illustrated by broken lines 134A in FIG. 5.

As the shaft 84 is rotated, in accordance the description hereinabove, the cam disc 122 releases the shaft 124 while the end 125 engages he reduced radius edge 130. This spring 134 urges the end 125 to the inner position shown by broken lines 125A so that the demand gear 111 drivingly meshes with the gear 107 to, in turn drive the demand indicating mechanism 76. As the camming surface end 129A engages the shaft end 125 it is cammed to the outer position to demesh the gears 107 and 111 and decouple the demand indicating mechanism 76 from the shaft 116. This ends the on-peak demand measuring period until the camming surface end 129B is rotated past the shaft end 125 to let the spring 134 urge the gear 107 to mesh with the gear 111. The lateral meshing and demeshing of the gears 107 and 111 has been found to result in less interference than the axial meshing operation provided in the coupler unit 34 illustrated in FIG. 1.

The camming surface 129 may extend different arcuate distances, preferable in increments of 45° to provide different on-peak demand measuring periods. The cam disc 122 may be modified to have a complete circular edge equal to the reduced radius of the edge 130 and fasten separate arcuate segments to provide the camming surface 129. Such segments having different arcuate lengths can be easily replaced to vary the on-peak demand measuring period in accordance with the description hereinabove by removal of the bearing screw 88 and the shaft 84. In these arrangements the shaft 84 carrying either of the cam discs 96 or 122 must be removed and a disc with the desired camming surface contour must replace the existing disc to change the on-peak demand measuring period.

Figure 6:
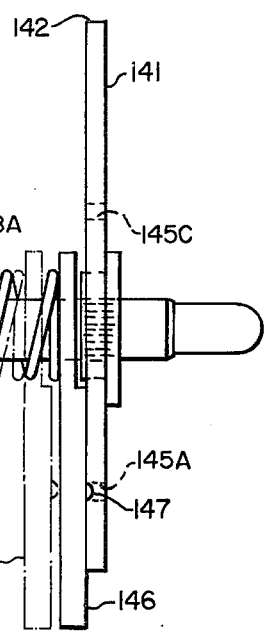
FIG. 6 illustrates a side elevational view of an alternative overriding cam disc arrangement for use in the mechanism shown in FIGS. 4 and 5.
Figure 7:
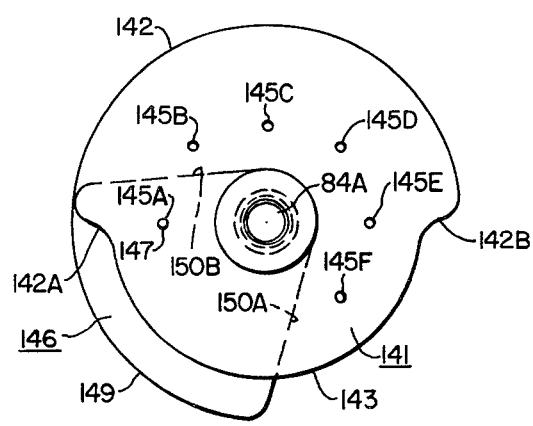
FIG. 7 illustrates a rear elevational view of the disc arrangement shown in FIG. 6.

In FIGS. 6, 7, 8, 9 and 10 there are illustrated alternative embodiments of overriding cam disc arrangements for changing the on-peak demand measuring periods in the register 18. This avoids the necessity of removing the shaft 84, described above, to change the cam disc. In FIGS. 6 and 7 one preferred embodiment of an alternative overriding cam disc arrangement 140 is illustrated to replace cam disc 96 on a shaft 84A which replaces the shaft 84 in the on-off timing mechanism 120 having the releasable gear coupler 121 shown in FIGS. 4 and 5. Accordingly, the shaft 84A also carries the eight tooth gear 94 and the locking gear 95 in the same manner as does the shaft 84 to provide the same gear coupling and decoupling operation.

A fixed cam disc 141 is press fitted to the rear of the shaft 84A at substantially the same location as is the cam disc 122 shown in FIG. 4. The cam disc 141 has substantially the identical peripheral edge contour as does the disc 122. A circular camming surface 142 corresponds to the camming surface 129 and extends for substantially 180° between the camming surface leading and trailing ends 142A and 142B. A shorter radius disc circular edge 143 corresponds to the edge 130 of the cam disc 96. A circumferentially spaced series of index holes 145A, 145B, 145C, 145D, 145E and 145F are spaced 45° apart at the same radial distance from the center of the shaft 84A.

An adjustable cam disc segment 146 is mounted on the shaft 84A for free rotation thereon. A nipple-like protrusion 147 is provided on the rear face of the disc segment 146 so to be received in the holes 145A through 145F. This forms a releasable detent mechanism in combination with an axial biasing spring 148 to maintain the disc segment 146 in one of six 45° displaced positions relative to the cam disc 141. A circular arc camming surface 149 at the outer peripheral edge of the disc segment 146 has the same radius as the camming surface 142 to be coextensive therewith. The surface 149 extends approximately 90° to segment sides 150A and 150B defining the ends of the camming surface 149.

The spring 148 is coiled around the shaft 84A and extends between a collar 152 and the disc segment 146. The collar 152 is freely mounted around the shaft 84A and a snap ring 153 engages a groove in the shaft to stop forward axial movement of the collar 152. The coil spring 148 biases the cam segment 146 to maintain it in the detented position with the protrusion 147 in one of the index holes 145A through 145F and in a fixed position relative to the cam disc 141. To adjust the disc segment 146, it is pushed axially forward to release the protrusion 147 from one of the holes and then is repositioned arcuately so that the protrusion is axially aligned with the selected index hole. The broken lines 146A and 148A indicate the positions of the cam segment 146 and spring 148 when the cam segment is released from its detented position with the cam disc 141 for the adjustable overriding operation of the arrangement 140.

In the different overriding positions of the disc segment 146, different three hour on-peak measuring periods are afforded by different exposed arcuate extents of the disc edge 143. With the protrusion 147 in the index hole 145A, as shown, a 90° arcuate space between the segment side edge 150A and the camming surface end 142B. The forward shaft end 125 shown in FIGS. 4 and 5 rides against the camming surfaces 142 and 149 to establish the off-peak non-measuring period. The end 125 further rides against the disc edge 143 to establish an on-peak measuring period of 6 hours in accordance with the description of the on-off timing mechanism 120 illustrated in FIGS. 4 and 5. Accordingly, when the disc segment 146 is oriented so that the protrusion 147 is positioned in hole 145E a 6 hour on-peak measuring period is provided between segment edge 150B and the camming surface end 142 which is shifted six hours from that shown. With the protrusion 147 in holes 145B or 145D 125° of the disc edge 143 is exposed to provide a 9 hour on-peak measuring period. Finally, when the protrusion 147 is in the hole 145C, a 12 hour on-peak measuring period is provided. It is understood that the dial segment 73 shown in FIG. 3 would be replaced to indicate the measuring periods corresponding to the different cam configurations.

Figure 9:
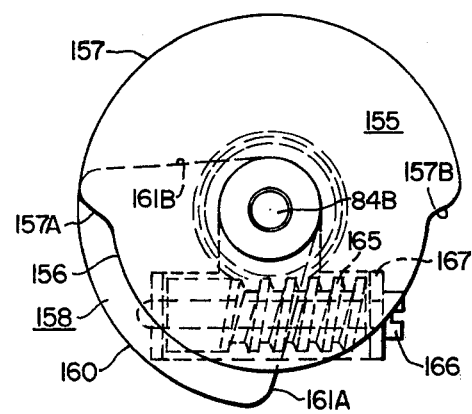
FIG. 9 illustrates a rear elevational view of the disc arrangement shown in FIG. 8.
Figure 8:
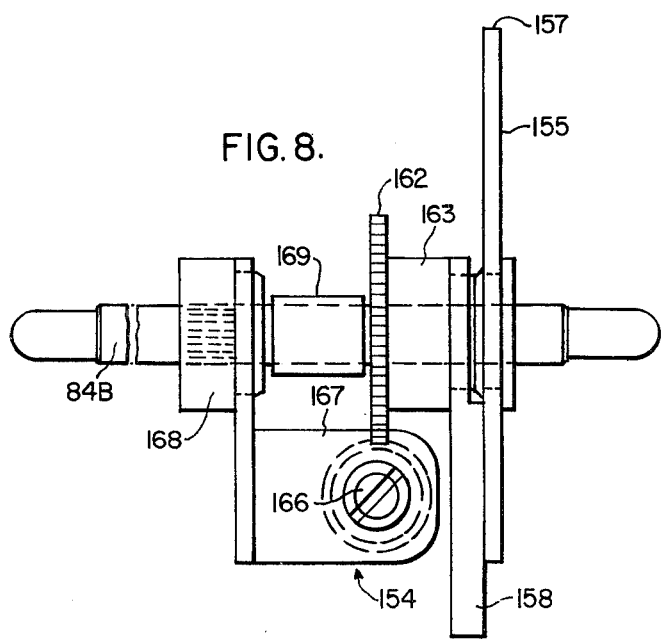
FIG. 8 illustrates a side elevational view of another embodiment of an overriding cam disc arrangement.

In FIGS. 8 and 9 there is shown another embodiment of an overriding cam disc arrangement 154 on a shaft 84B intended to replace the shaft 84A and carries the other parts described for the shaft 84. The overriding cam disc arrangement 154 including a fixed cam disc 155 having a reduced disc circular edge 156 and further having a camming surface 157 with ends 157A and 157B corresponding identically with the disc 141 and the camming surface 142 and disc edge 143 without the holes 145A through 145F. An adjustable cam disc segment 158 has an outer peripheral edge camming surface 160 with side edges 161A and 161B provided substantially identical to the camming surface 140 and side edges 150A and 150B of the disc segment 146 shown in FIG. 7. The segment 158 does not have the protrusion 147 and is integrally connected to a worm wheel gear 162 having a hub 163 carrying the segment 158 adjacent the forward face of the cam disc 155. The gear 162 meshes with a worm screw 165 having a slotted head 166. The worm screw 165 is rotatably supported in a bracket 167 supported in a cantilevered fashion from a hub 168. The hub 168 is press fitted to the shaft 84B forward of the worm wheel 162. A spacer sleeve 169 extends on the shaft 84B between the hub 168 and the gear 162 to maintain the disc segment 158 adjacent the fixed cam disc 155. Alternatively, a spring similar to spring 148 may replace the sleeve 169.

Rotation of the worm screw 165 by fitting a screwdriver tool into the slot of the head 166 varies the arcuate position of the disc segment 158 and the exposed portion of the disc edge 156 between the camming surfaces 157 and 160. This provides two infinitely variable series of overriding positions of the disc segment 158 relative to the camming surface ends 157A or 157B. These positions are infinitely variable between forty-five and one-hundred twenty degree distances extending between the camming surface ends 161A and 157B or the ends 161B and 157A. If the disc segment 158 is positioned equidistant between the camming surface ends 157A and 157B two three-hour on-peak demand measuring periods would be provided separated by 6 and 12 hour off-peak non-measuring periods, if such measurements were required.

Figure 10:
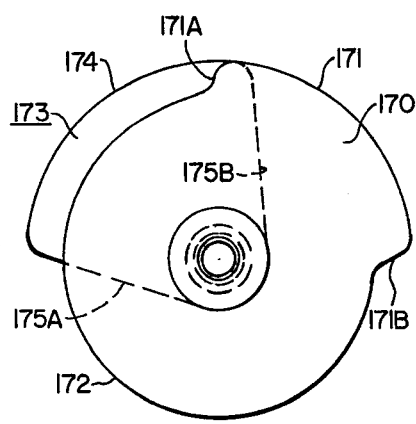
FIG. 10 illustrates an elevational view of another embodiment of a cam disc having a different camming profile to replace either of cam disc profiles shown in FIGS. 7 and 9.

In FIG. 10 there is illustrated the outline of a fixed cam disc 170 in which the peripheral edge contour thereof can replace that of the cam discs 141 or 156 described hereinabove. A modified camming surface 171 corresponds to the camming surfaces 142 and 157 except that the ends 171A and 171B extend at approximately 90° to each other rather than at the 180° arcuate displacement. A reduced radius circular edge 172 extends for substantially 270° rather than 180°. An adjustable cam disc segment 173 represents either of the disc segments 146 or 158. A camming surface 174 of the segment 173 is therefore adjustably coextensive with the camming surface 171 and is terminated by segment side edges 175A and 175B. Rotational adjustment of the segment 173 in accordance with either of the overriding cam disc arrangements 140 or 154 provides between 180° and 270° of the disc edge 172 exposed or between the camming surfaces ends 175A and 171B and 175B and 171A. This corresponds to variable on-peak demand measuring periods of between 12 and 18 hours.

It is contemplated that the demand meter 10 may be further modified beyond the several embodiments described hereinabove in accordance with the spirit and scope of our invention.

We claim:

1. A demand meter for periodically measuring maximum watt demand during a desired on-peak demand measuring period, comprising:

a watt-hour metering means responsive to the consumption of electrical energy of an electric load;

a timing motor means having an output rotated at a constant rate;

an on-off timing mechanism having a timing input rotatably driven in response to said output of said timing motor means, said on-off timing mechanism further including a releasable coupler means including a metering drive input and an output with said metering drive input connected to said watt-hour metering means, said coupler means being operable between coupling and decoupling states so as to connect and disconnect, respectively, said metering drive input and said output, and said on-off timing mechanism further including rotational means responsive to said timing input for rotation through a daily time cycle to effect the coupling and decoupling operation of said releasable coupler means during predetermined daily periods to establish said desired on-peak demand measuring period;

a maximum demand indicating means including a pusher drive and reset mechanism and a dial pointer for indicating maximum power demand of the load, said pusher drive and reset mechanism including a pusher drive operating input and a reset operating input with said pusher drive operating input connected to said output of said releasable coupler means only when said releasable coupler means is in said coupling state during said on-peak demand measuring period;

a demand interval timing means including an input driven in response to said output of said timing motor means and an output connected to said reset operating input of said pusher drive and reset mechanism, said demand interval timing means further including an intermittent motion arrangement connected between said input and output of the demand interval timing means to operate said reset operating input at predetermined demand intervals; and a time indicating mechanism including an input driven in response to said output of said timing motor so as to be driven therefrom in a common driven relationship with both said on-off timing mechanism and said demand interval timing means, said time indicating means further including a clock dial pointer and a manually adjustable time reset member, said reset member being operable to adjust the timing indicating mechanism so that said pointer is repositioned at a desired time setting and to concurrently reposition said on-off timing mechanism to maintain the same operative relationship therebetween whereby said desired on-peak demand measuring period occurs at predetermined daily periods indicated by said clock dial pointer.

2. The demand meter as claimed in claim 1 wherein said on-off timing mechanism includes an intermittent motion arrangement having a periodic movement at regularly spaced time periods integrally corresponding to the time period of said desired on-peak demand measuring period.

3. The demand meter as claimed in claim 2 wherein said rotational means of said on-off timing mechanism includes a cam means effecting the coupling and decoupling states of said releasable coupler means in response to the periodic movement of said intermittent motion arrangement.

4. The demand meter as claimed in claim 3 wherein the cam means includes a fixed cam disc having a predetermined camming surface and further includes an adjustable cam disc segment having a predetermined cam surface coextensive with said camming surface of said fixed cam disc so as to cooperatively define a combined camming surface directly controlling said coupling and decoupling states of the coupler means.

5. The demand meter as claimed in claim 4 wherein a manually operable overriding cam means adjustably positions the cam disc segment relative to said fixed cam disc for varying the duration of the desired on-peak demand measuring periods.

6. A demand meter for periodically measuring maximum demand during peak power demand periods of an electric power system, said demand meter comprising:

a watt-hour metering means responsive to the consumption of electric energy of an electric load;

a timing motor means;

a demand interval timing means including an input and output and one intermittent motion arrangement connected between said input and output, said input being driven continuously by said timing motor means so that said one intermittent motion arrangement drives said output at predetermined demand time intervals;

a time indicating means including a pointer driven by said input of said demand interval timing means, said time indicating means further including a manually adjustable time reset means operable to set said pointer at a desired time indicating position and concurrently maintain the output of the interval timing means in the same relative position with respect to the position of said pointer;

a maximum demand indicating means including plural pointer indicators, said maximum demand indicating means being connected to said output of said demand interval timing means so as to have a demand time interval controlled thereby; and an on-off timing mechanism including another intermittent motion arrangement driven by said output of said demand interval timing means, said on-off timing mechanism including rotational means driven by said another intermittent motion arrangement through a daily time cycle, said on-off timing means further including a releasable coupler means having coupling and decoupling states drivingly connecting and disconnecting, respectively, said watt-hour metering means and said maximum demand indicating mechanism during predetermined daily periods, said coupling and decoupling states being controlled by said rotational means in accordance with said daily time cycle when driven by said another intermittent motion arrangement so that a predetermined maximum demand measuring period only occurs during a desired daily time period indicated by said time indicating means.

7. A demand meter as claimed in claim 6 wherein the one and the another intermittent motion arrangements each include a single involute gear tooth means for engaging a multiple tooth gear such that rotation of the single tooth gear projection effects intermittent engagement with the teeth of said multiple tooth gear to transfer intermittent rotational movement to said multiple tooth gear.

8. The demand meter as claimed in claim 6 wherein said releasable coupler means includes a shiftable shaft member movable between first and second positions and carrying a gear and said maximum demand indicating means includes a gear having meshed and demeshed relationships with said gear of said shaft member when said shaft member is moved between said first and said second positions, and further wherein said rotational means of said on-off timing mechanism includes a cam member intermittently rotated in response to said another intermittent motion arrangement of said on-off timing mechanism for actuating said shaft member between said first and said second positions.

9. A demand meter as claimed in claim 8 wherein the shiftable shaft member is shiftable along the elongated axis of the shaft and said on-off timing mechanism includes a cam member having an axially raised camming surface relative to the elongated axis of the shaft member carrying said cam means so that said axially raised camming surface engages an end of the shaft member to effect one of the shaft member positions.

10. A demand meter as claimed in claim 8 wherein the cam member is adjustable to vary the duration of the predetermined maximum demand measuring period.

11. A demand meter as claimed in claim 8 wherein the shiftable shaft member includes a first shaft end pivotally movable about a second shaft end, and wherein the cam member includes a radially extending peripheral edge defining a camming surface engaged by said first shaft end so as to move said first shaft end between first and second arcuately displaced positions, said gear of said shaft member being arcuately positioned with respect to said gear of the maximum demand indicating means to effect corresponding meshed and demeshed relationships therebetween in response to the rotational position of said cam member.

12. The demand meter as claimed in claim 11 wherein the cam member includes a fixed cam disc secured in a fixed relationship to the shiftable shaft member and the cam member further includes an adjustable cam disc segment mounted for rotational movement about the shaft member and for positioning adjacent said fixed cam disc so that the camming surface extends along the peripheral edges both the fixed cam disc and the cam disc segment, and further so that said camming surface is variable to vary said predetermined demand measuring period.

13. The demand meter as claimed in claim 12 including a cam overriding arrangement wherein a detent means establishes predetermined fixed adjustable positions between said fixed cam disc and said cam disc segment defining different predetermined maximum demand measuring period durations.

14. The demand meter as claimed in claim 12 including a cam overriding arrangement wherein a worm wheel and worm screw interconnect the adjustable cam disc segment and said shaft member such that said worm wheel and worm screw are adjustable with respect to each other to vary the position of said cam disc segment relative to said fixed cam disc.

* * * * *